(12) United States Patent
Gutbrod et al.

(10) Patent No.: US 7,235,767 B2
(45) Date of Patent: Jun. 26, 2007

(54) CIRCUIT ARRANGEMENT FOR CONTROLLING ILLUMINATING MEANS

(75) Inventors: Thomas Gutbrod, Thuengersheim (DE); Anton Ruettiger, Wildflecken (DE); Harald Brischke, Bad Neustadt (DE); Michael Haub, Muennerstadt (DE)

(73) Assignee: PREH GmbH, Bad Neustadt/Saale ( * ) Notice: Subject to any disclaimer, the term of this patent is extended or adjusted under 35 U.S.C. 154(b) by 0 days.

(21) Appl. No.: 11/491,170

(22) Filed: Jul. 24, 2006

(65) Prior Publication Data

US 2006/0273236 A1 Dec. 7, 2006

Related U.S. Application Data

(63) Continuation of application No. PCT/EP2005/000248, filed on Jan. 13, 2005.

(30) Foreign Application Priority Data

Jan. 24, 2004 (DE) .................. 10 2004 003 698

(51) Int. Cl.
*G01J 1/32* (2006.01)
*B60Q 1/00* (2006.01)

(52) U.S. Cl. .................... 250/205; 362/489
(58) Field of Classification Search ........... 250/205; 362/489
See application file for complete search history.

(56) References Cited

U.S. PATENT DOCUMENTS

| | | | |
|---|---|---|---|
| 4,388,558 A | 6/1983 | Mizuno et al. | |
| 4,933,603 A * | 6/1990 | Bier | 315/77 |
| 5,149,176 A * | 9/1992 | Eccleston | 303/20 |
| 5,231,373 A * | 7/1993 | Freeman et al. | 340/469 |
| 5,910,709 A | 6/1999 | Stevanovic et al. | |
| 6,107,787 A * | 8/2000 | Wand | 323/299 |
| 6,198,405 B1 | 3/2001 | Andersson et al. | |
| 6,388,398 B1 | 5/2002 | Li et al. | |
| 6,690,121 B1* | 2/2004 | Weindorf | 315/247 |
| 7,022,961 B2 | 4/2006 | Glienicke et al. | |
| 2003/0058670 A1* | 3/2003 | Choi | 363/127 |
| 2003/0185004 A1* | 10/2003 | Vogel et al. | 362/235 |
| 2003/0222893 A1* | 12/2003 | Koester et al. | 345/691 |
| 2003/0227265 A1 | 12/2003 | Biebl | |
| 2005/0099490 A1* | 5/2005 | Stauffer et al. | 347/252 |
| 2005/0206718 A1* | 9/2005 | Komiya et al. | 347/246 |

FOREIGN PATENT DOCUMENTS

| | | |
|---|---|---|
| DE | 196 02 891 A1 | 8/1997 |
| DE | 102 09 622 A1 | 10/2003 |
| EP | 1 322 139 A1 | 6/2003 |

* cited by examiner

*Primary Examiner*—Georgia Epps
*Assistant Examiner*—Kevin Wyatt
(74) *Attorney, Agent, or Firm*—McGrath, Geissler, Olds & Richardson

(57) ABSTRACT

A circuit arrangement is disclosed for controlling an illuminating device, particularly light-emitting diodes, in a control device of a motor vehicle, comprised of at least one illuminating device, which is integrated in a switching circuit having a semiconductor component, and of a microprocessor, in particular having an integrated non-volatile memory, for generating a pulse-width modulated signal, whereby the pulse-width modulated signal is coupled to a control electrode of the semiconductor component, whereby the microprocessor generates at least two pulse-width modulated signals, the pulse-width modulated signals are coupled to the semiconductor component via a logical system and the logical system can be subjected to the action of an additional control signal via the microcomputer.

14 Claims, 2 Drawing Sheets

CIRCUIT ARRANGEMENT FOR CONTROLLING ILLUMINATING MEANS

This nonprovisional application is a continuation of International Application PCT/EP2005/000248, which was filed on Jan. 13, 2005, and which claims priority to German Patent Application No. DE 102004003698, which was filed in Germany on Jan. 24, 2004, and which are both herein incorporated by reference.

BACKGROUND OF THE INVENTION

1. Field of the Invention

The present invention relates to a circuit arrangement for controlling an illuminating device, in particular light-emitting diodes, in a control device of a motor vehicle, comprised of at least one illuminating device integrated in a switching circuit having a semiconductor component, and a microprocessor, in particular with an integrated non-volatile memory, for generating a pulse-width modulated signal, whereby the pulse-width modulated signal is connected to the control electrode of the semiconductor component.

2. Description of the Background Art

It is known to provide control elements in motor vehicles with an illumination. In order to adapt the illumination, or rather the backlighting, of the control elements and displays to ambient light effects, the illumination is adjustable. A distinction is thereby made between a day and night illumination on the one hand, and between a locator and function illumination on the other hand. Depending on the variation of interior design in the motor vehicle, it is also known to adapt, via a photo-sensitive sensor, these different types of lighting to the incident light striking the control element directly. There are different methods known for controlling the illuminating means.

Light-emitting diodes (LEDs) are typically used for as illuminating devices in control devices. The objective thereby is to achieve a harmonious, evenly illuminated layout of the control device. The luminosity of LEDs or lamps, however, tends to be very widely scattered so that the tolerances stipulated by the automobile industry can frequently not be achieved without further measures. From DE 196 02 891 A1, it is known to determine, after the manufacture of the control device, a correction factor depending on the brightness of the illuminating means, with which the control voltage or the control current of the illuminating means is adjusted.

In order for the described types of illumination to be even continuously adjustable and controllable, if need be, it is known from the cited publication to control the illuminating means via a semiconductor component, and in particular via a pulse-width modulated signal (PWM). With the assistance of a PWM signal present at the output of a microprocessor, a transistor, for example, is clock-controlled, which allows for the brightness of the light-emitting diode to be adjusted with very great precision. Due to the modulation of the pulse width, the brightness of the light of the illuminating means can thus be altered, whereby the duty cycle, that is, the ratio of impulse duration to cycle duration, represents a direct measure of the brightness of the illuminating means.

In order to be able to regulate the illumination of a combined locator and function symbol via a PWM signal of a control device, which can be a microcomputer, for example, in dependence from incident sunlight, it is known from DE 102 09 622 A1, which corresponds to U.S. Pat. No. 7,022,961, to detect the brightness in the ambient area of the control element via an optoelectric sensor. The influence of a non-linearity of the light-current characteristic line of the respective LED, which occurs at high currents, for example, self-heating of the LEDs, can hereby be adjusted by way of a characteristic line stored in a software of a control unit, whereby the PWM ratio is preferably adapted.

It is known from patent application DE 102 54 741 to influence a pulse-width modulated signal for the activation of LEDs in the duty cycle. For this purpose, the PWM signal generated in the microcomputer in a circuit arrangement having logical connectives is influenced such that only every other impulse of the PWM signal is transmitted to the illuminating means.

SUMMARY OF THE INVENTION

It is therefore an object of the present invention to provide, with minimal constructive expenditures, a circuit arrangement, which makes it possible to realize a locator and function illumination with only one LED, and furthermore, allows a very precise adjustment of the illuminating device in a control device.

According to the invention, the objective is met such that the microprocessor generates at least two pulse-width modulated signals, and that the pulse-width modulated signals are interconnected with the semiconductor component by a logical system, and that the logical system can be subjected to an additional control signal via the microcomputer. As a result of the basic idea of the invention, it is now possible to adjust the intensity of one illuminating device, or a plurality thereof, with great precision. Thus, a locator and function illumination via a single LED, respectively, can be realized. Whereas in the past, two LEDs of widely differing luminosity, for example, were utilized for the illumination of a control element to realize the locator and function illumination, each individual LED can now be used for the locator illumination as well as for the function illumination in accordance with the present invention. There is an additional benefit when display strings are used. If, for example, a display string is used for a temperature scale, merely one LED has to be arranged behind each scale value. In turn, this direct integratability in the display string results in a reduction in size of the control elements. Even under varying ambient conditions, for example, with incident light, the temperature scale used as an example can thus be provided with a locator illumination that is individually adjustable, and can be provided with a likewise controllable function illumination via the same illuminating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
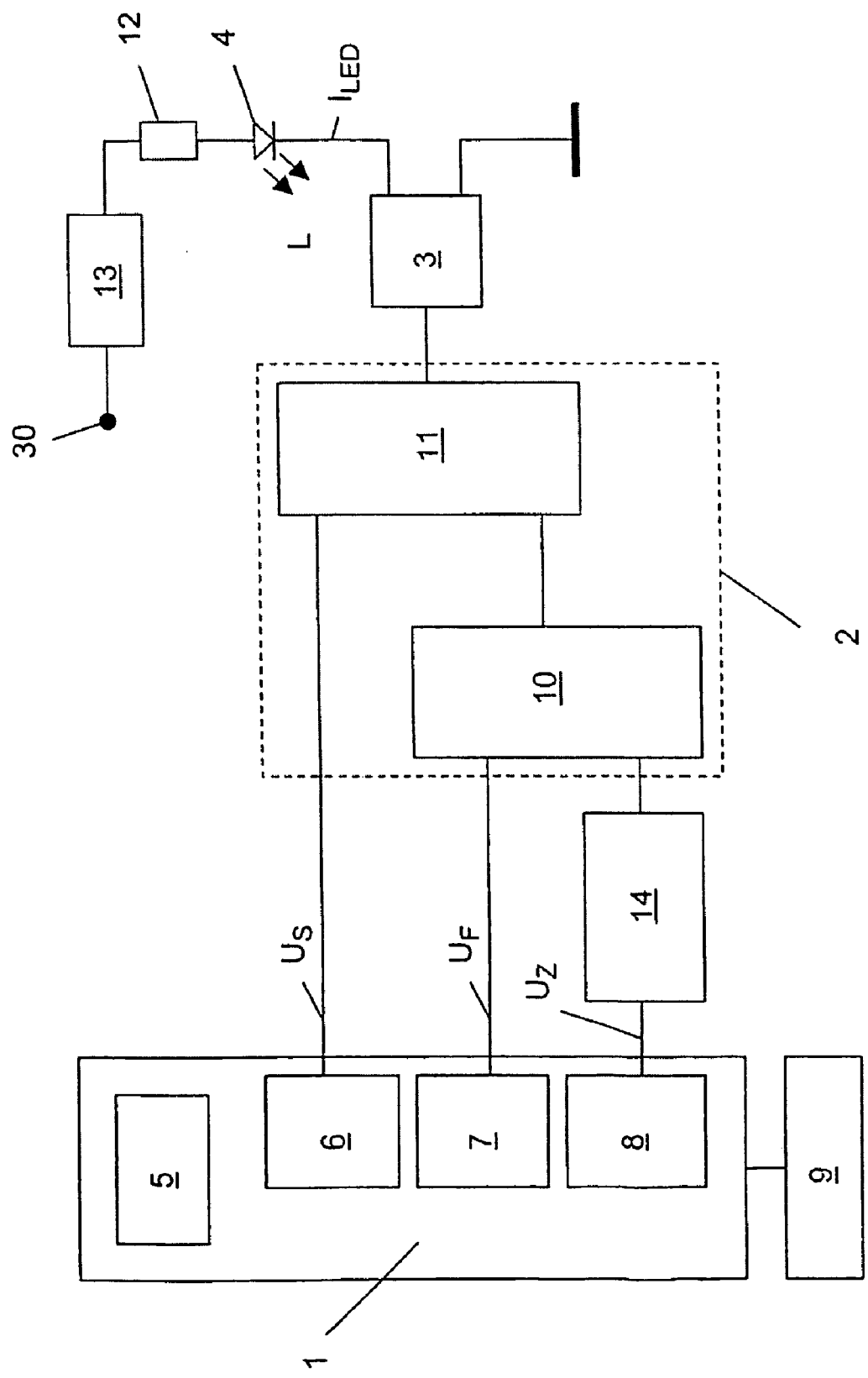
FIG. 1 illustrates a basic configuration of a circuit for controlling an illuminating device according to an embodiment of the invention.

The circuit arrangement in FIG. 1 illustrates a principal embodiment of the invention. The purpose of the drawing is to reflect the essential idea of the invention. It is explicitly noted that FIG. 1 merely illustrates an exemplary embodiment for the realization with the means in accordance with the invention, which naturally implies other circuit arrangements also, which essentially are structured the same but have a different circuit configuration.

The exemplary embodiment illustrated in FIG. 1 includes a microcomputer 1 for generating a pulse-width modulated signal, a system having an integrated logic 2, a semiconductor component 3, and an illuminating device 4. The microcomputer 1 includes an oscillator 5 as a time basis for clock generation. Both pulse-width modulated signals (PWM) are thereby generated on the same time basis. By way of the frequency generated in oscillator 5, a first pulse-width modulated signal 6 for the locator illumination, and a second pulse-width modulated signal 7 for the function illumination are generated in microcomputer 1. In addition, the microcomputer 1 includes an interface with outputs 8, through which the operator is able to alternately switch the illuminating device 4 between a locator illumination and a function illumination. In order to further improve the comfort level and for tuning the brightness of illuminating device 4, a photo-sensitive sensor 9 is connected to microcomputer 1, whereby the use of an incident light sensor with signal processing is preferred. With the photo-sensitive sensor 9, the brightness of a function illumination can be adaptively adjusted to the ambient brightness, for example. Such a photo-sensitive sensor 9 is practical, for example, when the control element, in which the illuminating device 4 is integrated, is exposed to direct incident sunlight. When the function illumination is turned on, direct incident solar radiation can make it very difficult for the operator of a control element in a motor vehicle to detect the function illumination. In this case, an adaptive post-adjustment of the brightness of the illuminating device 4 with the incident light sensor 9 can be performed to make the selected function recognizable to the operator.

Connected downstream of the microcomputer 1 is the system 2 with an integrated logic. In this exemplary embodiment with the illustrated circuit arrangement, system 2 is formed of an AND gate 10 and an OR gate 11, via which the two signals 6, 7, as well as the output signal for the operator control 8 are linked to the input signal of the semiconductor component 3. The illuminating device 4 is wired via the semiconductor component 3. In turn, the illuminating device 4 is connected to the electrical distribution system of the vehicle, for example, to clamp 30, on the one hand, and to the semiconductor component 3 on the other hand so that in an ON position, the illuminating device 4 can emit light L. As an option, a series resistor 12 can be inserted upstream of the illuminating device 4. Depending on the semiconductor component 3 used, a voltage regulator 13 can be inserted in the supply line between clamp 30 in the electrical supply system in the vehicle and illuminating device 4. If, for example, the semiconductor component 3 used is a semiconductor switch, for example, a transistor, a voltage regulator 13 in the supply line to the illuminating device 4 can be provided in order to eliminate voltage variations of the electrical supply system of the vehicle at clamp 30. If a semiconductor current source 3 is used, the voltage regulator 13 is not needed; merely a series resistor 13 can be inserted as an option.

Figure 2:
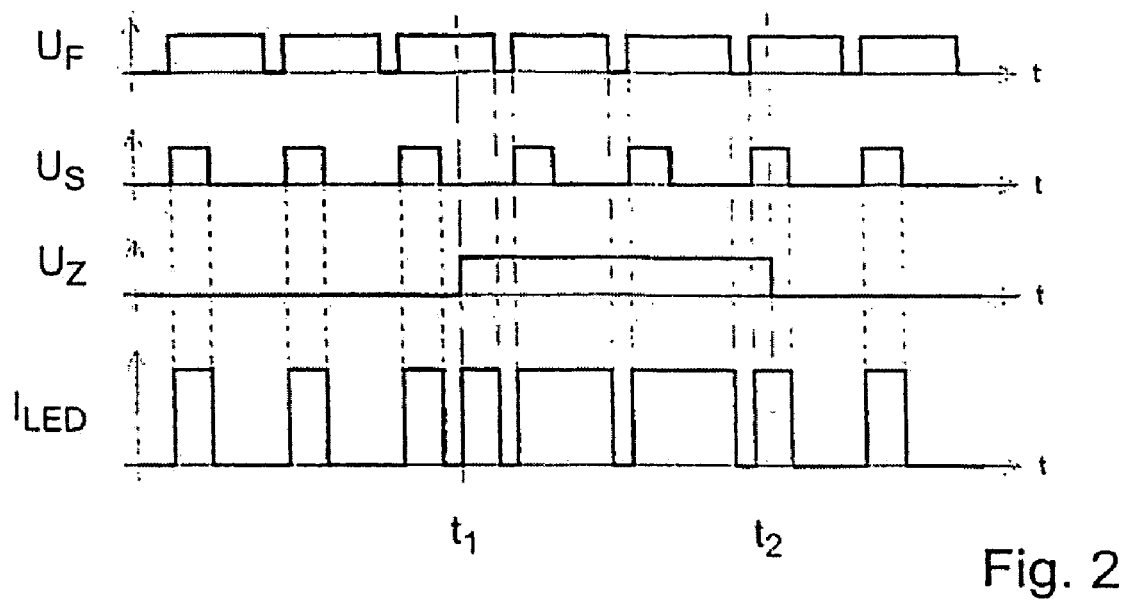
FIG. 2 is a timing diagram of voltages in the circuit and the current through the illuminating device.

From the clock pulse generated by oscillator 5, which in addition can be split if necessary, a PWM signal 6 corresponding to the locator illumination is generated in the microcomputer, and is transmitted as voltage $U_S$ to the OR connective 11 of the logical system. In FIG. 2, a PWM signal $U_S$ corresponding to the locator illumination is illustrated in time progression. If only the locator illumination is activated, a current $I_{LED}$ for illuminating device 4 is adjusted via the OR gate by the PWM signal 6, or voltage $U_S$, via the semiconductor component 3. The time-progressive course of current $I_{LED}$ UP to instant $t_1$ is illustrated in a diagram in FIG. 2. A second PWM signal 7 for the function illumination is generated via oscillator 5 in microcomputer 1. The time-progressive behavior of generated voltage $U_F$ for the function illumination is also illustrated in FIG. 2. The logical AND gate 10 is subjected to voltage $U_F$ for the function illumination on the one hand, and is connected to an output 8 of the microcomputer 1 on the other hand. If the operator of a motor vehicle activates a control device, which up to instant $t_1$ was operating a locator illumination, the corresponding output of microcomputer 1 is subjected to a voltage $U_Z$ via interface 8, and thus, two voltages are present at the inputs of AND connectives 10 at instant $t_1$ so that at its output, the AND connective 10 also generates a signal. With this signal at the output of AND connective 10, the locator illumination signal $U_S$ is overwritten by the function illumination signal $U_F$ with the assistance of OR gate 11. As is shown in FIG. 2, the illuminating device 4 is subjected to a current $I_{LED}$, which corresponds with the behavior of the voltage for function illumination $U_F$. As a result of the longer turn-on time of the illuminating device 4, which in particular can also be an LED, brighter luminosity and thus a display as function illumination is obtained.

Figure 3:
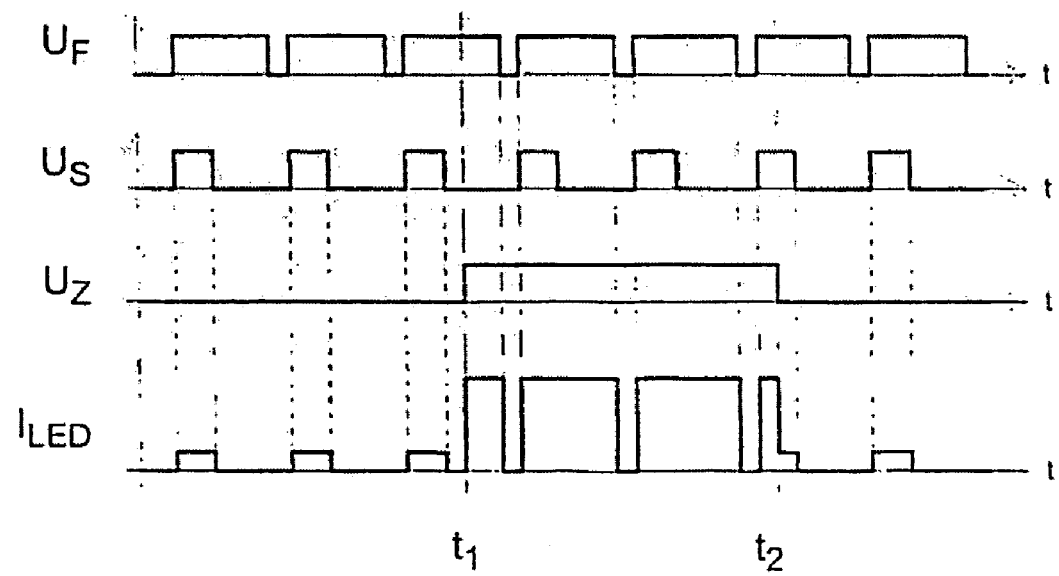
FIG. 3 is another timing diagram of the voltages through the circuit and the behavior of the current through the illuminating device.

The diagram in FIG. 2 illustrates the adjustment of the brightness of the illuminating device 4 solely via the duty cycle. However, the brightness of illuminating device 4 can also be determined by the value of the rectangular current flowing through illuminating device 4. The concept of using an identical current for locator and function illumination has the advantage that nonlinearities in the control, which can occur due to temperature fluctuations, for example, are thus avoided. In FIG. 3, the concept is shown using a current commutation. At instant $t_1$, a signal $U_Z$ is sent to the logic, also via output 8, and likewise, a switch is made between locator illumination and function illumination until instant $t_2$ is reached, at which time another switch is made from the function illumination to the locator illumination. In both figures, instant $t_2$ is equal to the instant, when the operator again activates the control element, and the function is turned off. In FIG. 3, not only is the duty cycle of current $I_{LED}$ flowing through illuminating device 4 altered, but the current value is also increased. It is thus possible to utilize the brightness of the illuminating device 4, that is, its adjustability, across the entire area. In the concept of current commutation, current $I_{LED}$ varies at a ratio of about 3:1 to 10:1. Preferably, the current commutation is adjusted to a ratio of 5:1. The current flow during the locator illumination is thereby about 5 mA and 25 mA. The adjustment of the current commutation ratio can also be controlled via the photo-sensitive sensor 9, for example.

Signal $U_Z$, with which the switch between locator and function illumination of the illuminating device 4 is made, can be tapped off directly at microcomputer 1, or, if a very large number of illuminating devices are used in a control device, in which case a very large number of outputs would have to be provided at microcomputer 1, a shift register 14 can be connected to microcomputer 1. It is not mandatory to use a shift register 14 for this purpose. A demultiplexer, a bit-addressable register, or a scaler with or without pickup register can also be used. The register 14 would then have a corresponding number of outputs, which in turn would be separately connected to the input of a separate AND gate. Each AND gate 10 would then be also subjected to voltage $U_F$ for the function illumination, as is illustrated in principle in FIG. 1 for an LED. Thus, to each output of the AND gate, a corresponding input of a separate OR gate is linked. Each OR gate 11 simultaneously comprises a second input for voltage $U_S$ of the locator illumination. Depending on the number of illuminating devices 4 used, a corresponding number of logical units 10, 11, and also semiconductor components 3 are thus available so that each illuminating device 4 can be controlled separately. It goes without saying that not all possible circuit concepts can be described here; however, it is particularly noted that for system 2, for example, a discrete logic, or a diode network, or a programmable logic can be used.

To increase the resolution of the locator illumination, only every $x^{th}$ cycle of the locator illumination signal $U_S$ can be enabled for activation. For this purpose, an external circuitry comprised of one, or a plurality of, bi-stable scanning stages or dividers are used, which respond to each rising edge of the locator illumination signal $U_S$, for example, and after x of such events in one cycle, either enables or blocks the locator illumination signal $U_S$ via a gate circuit. It is conceivable, for example, to use an AND gate for this purpose. This circuit arrangement can also be integrated in a programmable logic or in an application-specific integrated circuit (ASIC). However, in this case, the cycle duration for the function and the locator illumination signals $U_F$, $U_S$, has to be increased by the factor x so that a visible flickering of the locator illumination, which starts at about 80 Hz, is avoided.

To provide display contrast even with incident light, the photo-sensitive sensor 9 is integrated in the surface of the dash board in a suitable location, for example, where there is no control knob shading. Via the microcontroller 1, the duty cycle of the PWM signals $U_S$, $U_F$, can then be adjusted to incident light by way of a correction table or the like, thus adjusting the illuminating device 4 to a higher brightness. With a similar measure, the brightness can also be corrected, depending on the temperature of illuminating device 4. For example, a correction may be required in the event that the ambient temperature is increasing, or when the components heat up due to current-generated heat. Optimally, a temperature sensor can also be connected to the microcomputer.

It is essential for the invention to make it possible to realize the locator and the function illumination via one single illuminating device 4 each by using the suggested circuit arrangement of the present invention. Furthermore, it is possible to provide, in combination with a freely rotatable control knob, personalized operation. If the motor vehicle is used by several people, for example, it is possible that after the start of the motor vehicle, or during the operation thereof, a personalized adjustment, including the display of the individual functions of the motor vehicle, can be preprogrammed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for controlling an illuminating device in a control element of a motor vehicle, the circuit arrangement comprising:
   at least one illuminating device that is integrated in a switching circuit with a semiconductor component;
   a microprocessor for generating at least two pulse-width modulated signals; and
   a logic system for receiving the at least two pulse-width modulated signals and an input control signal, the logic system providing a control signal to the semiconductor component on the basis of the at least two pulse-width modulated signals and the input control signal for controlling an illumination of the illuminating device.

2. The circuit arrangement according to claim 1, wherein the circuit arrangement further includes a series resistor and a semiconductor switch.

3. The circuit arrangement according to claim 2, wherein a voltage regulator is integrated with the illumination device.

4. The circuit arrangement according to claim 1, wherein semiconductor component is a controllable semiconductor current source.

5. The circuit arrangement according to claim 1, wherein the microcomputer is connected to an incident light sensor.

6. The circuit arrangement according to claim 1, wherein a first pulse-width modulated signal for attaining a function illumination is connected via a logical AND gate and an outlet of the microcomputer or with an OR gate; and
   a second pulse-width modulated signal for attaining a locator illumination is connected via a logical OR gate to the semiconductor component or with the AND gate.

7. The circuit arrangement according to claim 1, wherein a switching module is provided between the microcomputer and the logical system.

8. The circuit arrangement according to claim 1, wherein the pulse-width modulated signals have substantially identical cycle durations but different duty cycles.

9. The circuit arrangement according to claim 1, wherein a divider circuit is provided downstream from the microcomputer in the line for the pulse-width modulated signal for the locator illumination, which transmits only every $n^{th}$ period.

10. The circuit arrangement according to claim 1, wherein the illuminating device is a light emitting diode.

11. The circuit arrangement according to claim 1, wherein the microprocessor has an integrated non-volatile memory.

12. A method for controlling an illuminating device, comprising:
    providing an input control signal and at least two pulse-width modulated signals, wherein the input control signal selects a type of illumination for the illuminating device;
    combining the at least two pulse-width modulated signals and the input control signal to generate a combined control signal; and
    controlling a brightness of the illuminating device based upon the combined control signal.

13. The method according to claim 12, further comprising:
    performing a logical AND operation on the input control signal and a first pulse-width modulated signal, wherein the first pulse-width modulated signal corresponds to a function illumination; and performing a logical OR operation on the result of the logical AND operation and a second pulse-width modulated signal, wherein the second pulse-width modulated signal corresponds to a locator illumination to produce the combined control signal.

14. The method according to claim 12, wherein the pulse-width modulated signals have substantially identical cycle durations but different duty cycles.

* * * * *